United States Patent
Yamaguchi et al.

(10) Patent No.: US 11,807,058 B2
(45) Date of Patent: Nov. 7, 2023

(54) SUSPENSION AND COIL SPRING OF THE SAME

(71) Applicants: Toyota Jidosha Kabushiki Kaisha, Toyota Aichi-ken (JP); Subaru Corporation, Tokyo (JP)

(72) Inventors: Tsuneo Yamaguchi, Nagakute (JP); Hidenori Yoshioka, Toyota (JP)

(73) Assignees: TOYOTA JIDOSHA KABUSHIKI KAISHA, Toyota Aichi-ken (JP); SUBARU CORPORATION, Shibuya-ku Tokyo (JP)

( * ) Notice: Subject to any disclaimer, the term of this patent is extended or adjusted under 35 U.S.C. 154(b) by 0 days.

(21) Appl. No.: 17/406,828

(22) Filed: Aug. 19, 2021

(65) Prior Publication Data
US 2022/0097469 A1   Mar. 31, 2022

(30) Foreign Application Priority Data
Sep. 25, 2020   (JP) .................. 2020-161376

(51) Int. Cl.
*B60G 11/14*   (2006.01)

(52) U.S. Cl.
CPC .......... *B60G 11/14* (2013.01); *B60G 2204/40* (2013.01)

(58) Field of Classification Search
CPC ............... B60G 11/14; B60G 2204/40; B60G 2202/12; B60G 2204/124; B60G 11/16; F16F 1/126; F16F 1/024
See application file for complete search history.

(56) References Cited

U.S. PATENT DOCUMENTS

| | | | |
|---|---|---|---|
| 4,869,471 A * | 9/1989 | Schwarz ................. | F16F 1/024 267/180 |
| 2010/0252971 A1 | 10/2010 | Lee | |
| 2010/0289199 A1* | 11/2010 | Lee ......................... | B60G 11/16 267/286 |
| 2014/0225302 A1* | 8/2014 | Kim ..................... | B29C 48/0018 264/209.3 |
| 2016/0333956 A1 | 11/2016 | Teichmann et al. | |
| 2017/0174030 A1* | 6/2017 | Mori ........................ | F16F 1/04 |
| 2018/0362698 A1* | 12/2018 | Joo ..................... | C08G 18/7678 |

FOREIGN PATENT DOCUMENTS

| | | | | |
|---|---|---|---|---|
| CN | 106104062 A * | 11/2016 | ............ | B60G 11/14 |
| DE | 102007062596 A1 * | 6/2009 | ............ | B60G 11/14 |
| DE | 102018214797 B3 * | 1/2020 | ............ | B60G 11/14 |
| FR | 2656052 A1 * | 6/1991 | | |
| FR | 2669389 A2 * | 5/1992 | ............ | F16F 1/024 |
| FR | 2986292 A1 * | 8/2013 | ............ | F16F 1/024 |
| FR | 3004386 A1 * | 10/2014 | ............ | B60G 11/16 |
| GB | 1582313 A * | 1/1981 | ............ | B60G 11/14 |
| JP | 2008-056002 A | 3/2008 | | |

(Continued)

OTHER PUBLICATIONS

Machine Translation of DE102007062596 (Year: 2009).*
Machine Translation of KR100417719 (Year: 2006).*
Machine Translation of KR20130028283 (Year: 2013).*

*Primary Examiner* — Drew J Brown
(74) *Attorney, Agent, or Firm* — Dinsmore & Shohl LLP

(57) ABSTRACT

A suspension for a vehicle, includes a coil spring interposed between a vehicle body and an axle. An end turn portion on at least one end of the coil spring is covered by a viscoelastic material.

8 Claims, 2 Drawing Sheets

(56) References Cited

FOREIGN PATENT DOCUMENTS

| | | | | |
|---|---|---|---|---|
| JP | 2010-242968 | A | 10/2010 | |
| JP | 2017-015249 | A | 1/2017 | |
| KR | 200370482 | Y1 * | 8/2004 | |
| KR | 100417719 | * | 6/2006 | |
| KR | 20080101120 | A * | 11/2008 | |
| KR | 20100038996 | A * | 4/2010 | |
| KR | 20120137026 | A * | 12/2012 | |
| KR | 20130028283 | A * | 3/2013 | |
| KR | 20170008347 | A * | 1/2017 | |
| KR | 101729955 | B1 * | 5/2017 | |
| KR | 20180000031 | A * | 1/2018 | |
| KR | 10-1986328 | B1 | 6/2019 | |
| WO | WO-2011118390 | A1 * | 9/2011 | ............ B60G 11/15 |
| WO | WO-2017139627 | A1 * | 8/2017 | ............ B62D 1/181 |
| WO | WO-2020043651 | A1 * | 3/2020 | ............ B60G 11/14 |

\* cited by examiner

SUSPENSION AND COIL SPRING OF THE SAME

CROSS-REFERENCE TO RELATED APPLICATION

This application claims priority to Japanese Patent Application No. 2020-161376 filed on Sep. 25, 2020, incorporated herein by reference in its entirety.

BACKGROUND

1. Technical Field

The technology disclosed in the present specification relates to a suspension for a vehicle, and a coil spring used in the suspension.

2. Description of Related Art

Japanese Unexamined Patent Application Publication No. 2008-56002 (JP 2008-56002 A) discloses a rear suspension for a vehicle. This rear suspension has a coil spring interposed between a vehicle body and an axle, in a configuration in which one end of the coil spring is attached to the vehicle body via a spring seat rubber. Spring seats are also referred to as spring insulators, and are provided to suppress transmission of vibrations and occurrence of noise.

SUMMARY

Trouble can occur with the above rear suspension, in which the spring seat rubber comes loose or becomes displaced when assembling the coil spring to the vehicle body, leading to a problem of lower productivity of manufacturing the vehicle. The present specification provides technology whereby such trouble can be reduced and productivity of manufacturing the vehicle can be improved.

A suspension for a vehicle, according to an aspect of the disclosure, includes a coil spring interposed between a vehicle body and an axle. An end turn portion on at least one end of the coil spring is covered by a viscoelastic material.

According to the above structure, the viscoelastic material covering the end turn portions can function in the same way as a spring seat rubber and suppress transmission of vibrations and occurrence of noise. Accordingly, there is no need to provide a spring seat rubber where at least one of the end turn portions is covered by the viscoelastic material out of both ends of the coil spring, and trouble such as the spring sheet rubber coming loose or becoming displaced can be reduced. As a result, productivity of manufacturing the vehicle can be significantly improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
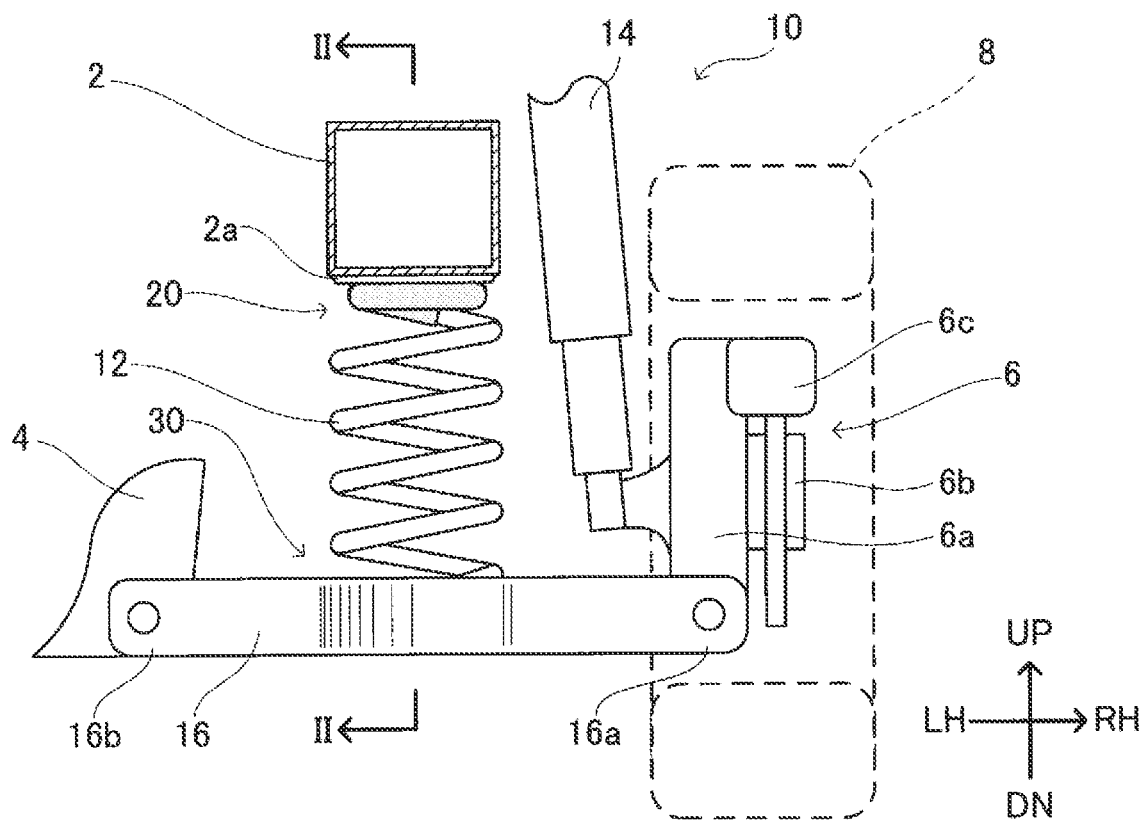
FIG. 1 is a diagram illustrating a rear suspension attached to a vehicle from the rear.

In an embodiment of the present technology, a coil spring may have a first end that is attached to a vehicle body side, and a second end that is attached to an axle side. In this case, an end turn portion may be covered by a viscoelastic material at the first end. According to this configuration, a spring seat rubber between the vehicle body and the coil spring can be omitted. With regard to this point, confirmation has been made that trouble readily occurs in a conventional rear suspension when assembling the coil spring to the vehicle body, in which the spring seat rubber disposed between the vehicle body and the coil spring comes loose or is displaced. Accordingly, an arrangement that enables the spring seat rubber to be omitted between the vehicle body and the coil spring can effectively improve productivity of manufacturing the vehicle.

In the above-described embodiment, an end turn portion does not have to be covered by the viscoelastic material at the second end of the coil spring. That is to say, the spring seat rubber (or a spring insulator) may be provided between the coil spring and the axle in the same way as with a conventional arrangement. When assembling the coil spring to the vehicle body, the suspension including the coil spring is normally assembled to the axle in advance. In this case, no trouble such as the spring seat rubber disposed on the axle side as to the coil spring coming loose or being displaced occurs. Accordingly, covering by a viscoelastic material can be omitted regarding the end of the coil spring on the axle side (i.e., the second end), assuming use of the spring seat rubber.

In the above-described embodiment, when the coil spring is assembled to the vehicle, the first end of the coil spring may be situated upward of the second end of the coil spring. That is to say, the first end attached to the vehicle body side may be an upper end of the coil spring, and the second end attached to the axle side may be a lower end of the coil spring. Note however, that in another embodiment, the coil spring may be disposed horizontally. Alternatively, the first end attached to the vehicle body side may be the lower end of the coil spring, and the second end attached to the axle side may be the upper end of the coil spring.

In an embodiment of the present technology, the viscoelastic material may be a rubber material. Rubber materials have suitable flexibility and durability, and also are excellent with regard to functions of suppressing transmission of vibrations and occurrence of noise. Note however, that in another embodiment, the viscoelastic material may be a resin material or an elastomer.

A rear suspension 10 according to an embodiment will be described with reference to the drawings. The rear suspension 10 according to the present embodiment is a suspension for a vehicle that travels over a road surface (a so-called automobile), and in particular is a suspension for a rear wheel 8 thereof. The rear suspension 10 according to the present embodiment can be employed in various types of vehicles, such as a gasoline-engine vehicles, electric vehicles, hybrid vehicles, fuel cell vehicles, and so forth, but is not limited in particular.

Now, the direction FR in the drawings indicates forward in the front-rear direction (vehicle-length direction) of the vehicle, and the direction RR indicates rearward in the front-rear direction of the vehicle. Also, the direction LH indicates leftward in the right-left direction (vehicle-width direction) of the vehicle, and the direction RH indicates rightward in the right-left direction of the vehicle. The direction UP indicates upward in the up-down direction (vehicle-height direction) of the vehicle, and the direction DN indicates downward in the up-down direction of the vehicle. Note that in the present specification, the front-rear direction, the right-left direction, and the up-down direction, of the vehicle may be referred to simply as the front-rear direction, the right-left direction, and the up-down direction, respectively.

Figure 2:
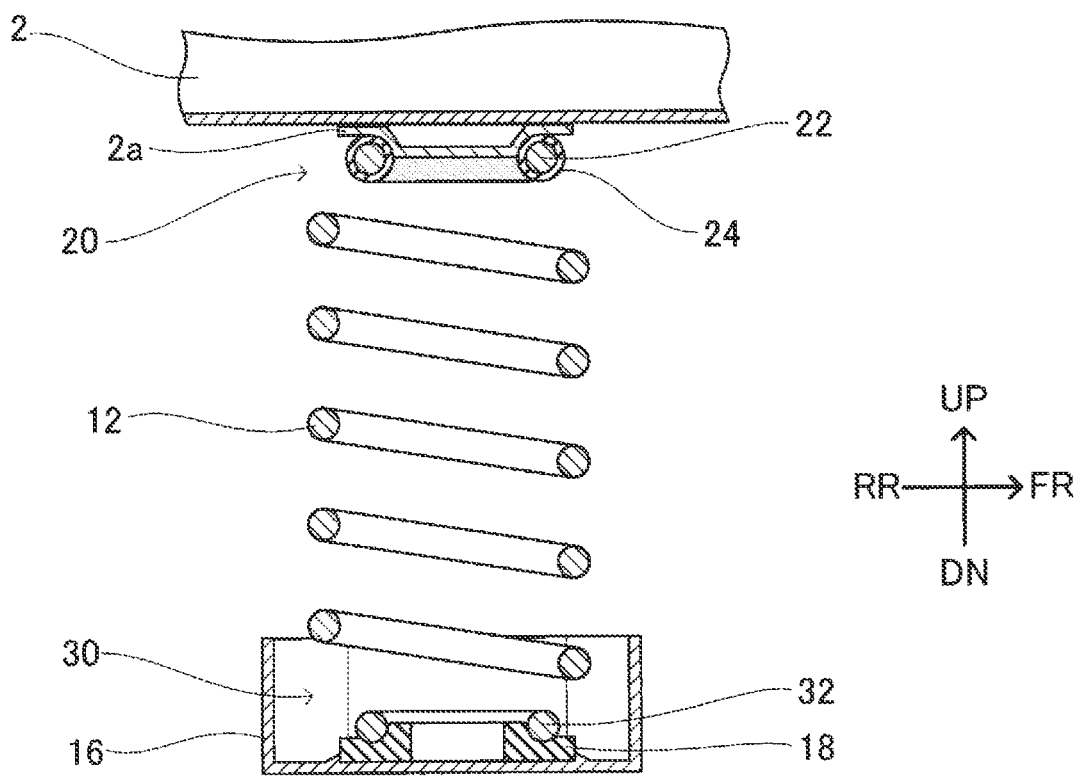
FIG. 2 is a cross-sectional view taken along line II-II in FIG. 1.

The rear suspension 10 is provided with a coil spring 12, a shock absorber 14, a plurality of suspension arms 16 and a spring insulator 18, as illustrated in FIGS. 1 and 2. The coil spring 12 is a type of spring part, in which a wire made of an elastic material is formed into a coil form. Note that the coil spring 12 is a compression coil spring, designed for a compressing load. The coil spring 12 according to the present embodiment is made up of spring steel, and has a generally cylindrical form, although not limited in particular. Note that the materials making up the coil spring 12 and the forms of the coil spring 12 are not limited in particular. The coil spring 12 is not limited to being a cylindrical coil spring, and may be a conical coil spring, a barrel coil spring, or an hourglass coil spring, for example.

The coil spring 12 is positioned between a vehicle body 2 and the suspension arms 16, and is disposed so as to be interposed between the vehicle body 2 and an axle 6. More specifically, an upper end 20 of the coil spring 12 abuts the vehicle body 2 from below, and is attached to the vehicle body 2. A lower end 30 of the coil spring 12 abuts one of the suspension arms 16 from above, and is attached to the axle 6 via this suspension arm 16. The term "axle 6" as used here means a mechanical assembly that rotatably supports the rear wheels 8. The axle 6 is supported so as to be capable of being displaced in the up-down direction by the suspension arms 16, which will be described in detail later. When the axle 6 is displaced in the vertical direction, the suspension arms 16 each rock. The coil spring 12 is deformed in accordance with the rocking of the suspension arms 16 (i.e., in accordance with the displacement of the axle 6), thereby functioning to suppress unevenness of the road surface from being transmitted to the vehicle body 2.

Part of the vehicle body 2 illustrated in FIG. 1 is a rear side member, which is a structural member extending in the front-rear direction of the vehicle body 2, although this is not limiting in particular. A spring seat 2a for holding the upper end 20 of the coil spring 12 is provided to the rear side member of the vehicle body 2. The spring seat 2a is configured of metal, the same as the vehicle body 2, and is fixed to the rear side member by welding. A rear suspension member 4 is also attached to the vehicle body 2. The rear suspension member 4 is attached to the vehicle body 2 along with the rear suspension 10 at the time of manufacturing of the vehicle. The rear suspension member 4 is fixed to the vehicle body 2, and can be interpreted as being part of the vehicle body 2. In other words, the rear suspension member 4, or a structure similar thereto, may be integrally provided with the vehicle body 2.

On the other hand, the axle 6 according to the present embodiment is provided with an axle main unit 6a, a hub 6b, and a brake unit 6c. The axle main unit 6a is attached to the vehicle body 2 and the rear suspension member 4 via the suspension arms 16, and is capable of being displaced in the up-down direction as to the vehicle body 2. The hub 6b is rotatably supported by the axle main unit 6a. The rear wheel 8 is configured to be detachably attached to the hub 6b. The brake unit 6c is capable of applying braking force to the hub 6b to which the rear wheel 8 is attached, in accordance with brake operations performed by the user, for example. Note that the configuration of the axle 6 described here is an example, and the specific configuration of the axle 6 is not limited in particular.

The shock absorber 14 is a mechanical element that damps vibrations attributable to the coil spring 12. The shock absorber 14 is interposed between the vehicle body 2 and the axle 6, and is configured to damp vibrations of the axle 6 with regard to the vehicle body 2. The shock absorber 14 according to the present embodiment is fixed to the vehicle body 2 at an upper end thereof (omitted from illustration), and a lower end thereof is fixed to the axle 6, although this is not limiting in particular. The specific configuration of the shock absorber 14 is not limited in particular. The shock absorber may be, for example, a telescopic shock absorber, or a fluid type shock absorber such as one using oil. Note that although the shock absorber 14 is disposed outside of the coil spring 12 in the rear suspension 10 according to the present embodiment, an arrangement may be made as another embodiment in which the shock absorber 14 is disposed inside the coil spring 12. That is to say, the shock absorber 14 may be disposed concentrically with the coil spring 12.

The suspension arms 16 support the axle 6 so that the axle 6 is capable of being displaced in the up-down direction, as described earlier. There are various forms of the suspension arms 16, such as those extending in the right-left direction of the vehicle, those extending in the front-rear direction of the vehicle, and so forth. Note that one suspension arm 16 that extends in in the right-left direction of the vehicle is illustrated in FIG. 1. The suspension arms 16 are each pivotably connected to the axle 6 at one end 16a thereof, and pivotably connected to the vehicle body 2 or the rear suspension member 4 at another end 16b thereof. The number and layout of the suspension arms 16, and the structure of each suspension arm 16, are not limited in particular. As one example, the suspension arm 16 illustrated in FIG. 1 has a channel-like form with the upper portion opened, and the lower end 30 of the coil spring 12 is accommodated therein (see FIG. 2).

Figure 3:
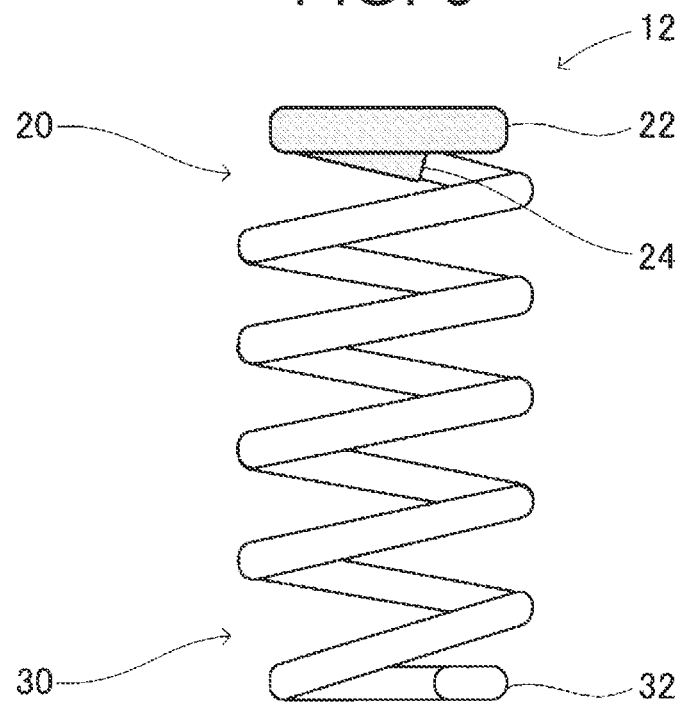
FIG. 3 is a diagram illustrating a lone coil spring.

As illustrated in FIGS. 2 and 3, an end turn portion 22 at the upper end 20 of the coil spring 12 is provided with a coating 24. The coating 24 is configured of a viscoelastic material, and covers the end turn portion 22. The coating 24 is interposed between the end turn portion 22 of the upper end 20 of the coil spring 12 and the spring seat 2a of the vehicle body 2, and can suppress transmission of vibrations and occurrence of noise. Accordingly, there is no need to provide a vibration-proofing member such as a spring insulator at the upper end 20 of the coil spring 12. Thus, trouble of the spring insulator coming loose or becoming displaced when assembling the coil spring 12 to the vehicle body 2 can be reduced. As a result, productivity of manufacturing the vehicle can be significantly improved.

On the other hand, an end turn portion 32 at the lower end 30 of the coil spring 12 is not covered by a viscoelastic material. Accordingly, the spring insulator 18 is provided between the end turn portion 32 and the suspension arm 16 at the lower end 30 of the coil spring 12. The spring insulator 18 is configured of a viscoelastic material such as a rubber material or the like, and can suppress transmission of vibrations and occurrence of noise. Note that trouble such as coming loose or becoming displaced does not readily occur for the spring insulator 18 situated on the axle 6 side during production of the vehicle. The reason is that the rear suspension member 4 and the axle 6 can be assembled together in advance, before assembly of the rear suspension 10 to the vehicle body 2. Accordingly, covering by a viscoelastic material can be omitted regarding the lower end 30 of the coil spring 12 (i.e., the end thereof situated on the axle 6 side), assuming use of the spring insulator 18.

Figure 4:
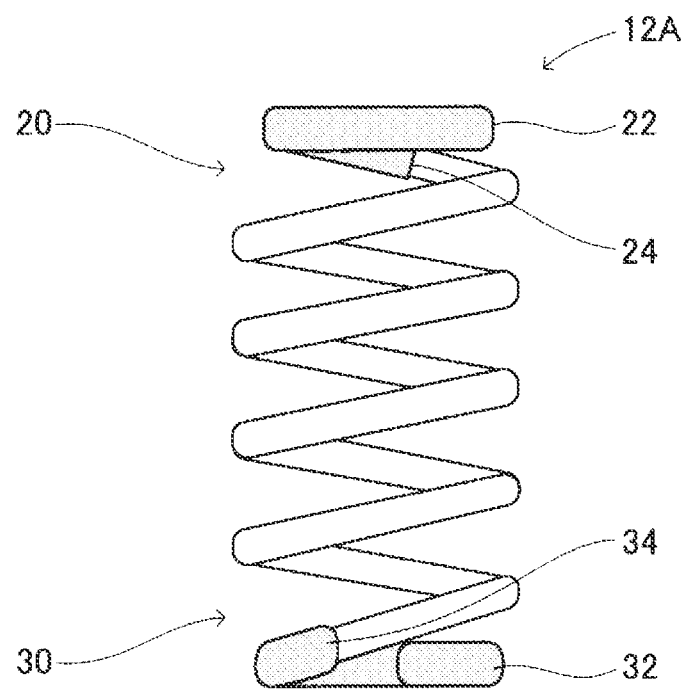
FIG. 4 is a diagram illustrating a lone coil spring according to a modification.

However, an arrangement may be made in which a coating 34 of viscoelastic material is provided to the end turn portion 32 of the lower end 30, in addition to the upper end 20 of the coil spring 12, in a coil spring 12A according to a modification as illustrated in FIG. 4. According to such a configuration, the spring insulator 18 can be omitted, and productivity of manufacturing the vehicle can be improved by reducing the number of parts and work man-hours. Note that in yet another modification, the coating 34 of a viscoelastic material may be provided to only the end turn portion 32 at the lower end 30 of the coil spring 12.

As described above in the rear suspension 10 according to the present embodiment, the end turn portions 22 and 32 are covered by a viscoelastic material on at least one end of the coil spring 12. According to such a structure, the viscoelastic material covering the end turn portions 22 and 32 can function in the same way as the spring insulator 18 and suppress transmission of vibrations and occurrence of noise. Accordingly, there is no need to provide a spring insulator where at least one of the end turn portions 22 and 32 is covered by the viscoelastic material out of both ends 20 and 30 of the coil spring 12, and trouble such as the spring insulator coming loose or becoming displaced can be reduced. As a result, productivity of manufacturing the vehicle can be significantly improved.

The specific configurations of the coatings 24 and 34 of the viscoelastic material are not limited in particular. For example, the thickness of the coatings 24 and 34 may be no less than 0.5 mm and no more than 10 mm, but is not limited to this. Also, the coatings 24 and 34 are made up of a rubber material in the present embodiment, but one or a plurality of optional viscoelastic materials may be used for the material making up the coatings 24 and 34. Examples of methods of forming the coatings 24 and 34 include injection molding using a mold, spraying molten viscoelastic material onto the coil spring 12, dipping the coil spring 12 into molten viscoelastic material, adhesion or pressure bonding of viscoelastic material formed to a sheet or a tube into the coil spring 12, and so forth, but are not limited to these.

Although embodiments have been described above in detail, these are only exemplifications, and do not limit the Claims. The technology set forth in the Claims includes various modifications and alterations of the specific example exemplified above. Technical elements described in the present specification or the drawings exhibit technical utility, either singularly or through various types of combinations, and do not limit combinations set forth in the Claims at the time of application.

What is claimed is:

1. A suspension for a vehicle having a vehicle body and an axle, the suspension comprising:
   a coil spring being interposed between the vehicle body and the axle,
   wherein:
   an end turn portion on at least one end of the coil spring is covered by a coating configured of a viscoelastic material, the coating having a thickness of between 0.5 mm and 10 mm; and
   the coil spring interposed between the vehicle body and the axle without arranging a spring seat formed of rubber between the vehicle body and the end turn portion.

2. The suspension according to claim 1, wherein:
   the coil spring has a first end that is attached to the vehicle body side, and a second end that is attached to the axle side; and
   the end turn portion is covered by the viscoelastic material at the first end.

3. The suspension according to claim 2, wherein the end turn portion is not covered by the viscoelastic material at the second end of the coil spring.

4. The suspension according to claim 2, wherein:
   the first end of the coil spring is an upper end of the coil spring, the second end of the coil spring is a lower end of the coil spring; and
   when the coil spring is assembled to the vehicle, the upper end of the coil spring is situated upward of the lower end.

5. The suspension according to claim 1, wherein the viscoelastic material is a rubber material.

6. The suspension according to claim 1, wherein the at least one end of the coil spring is configured to suppress transmission of vibrations and occurrence of noise to the vehicle body.

7. A coil spring used in a suspension for a vehicle having a vehicle body and an axle, the coil spring comprising:
   an end turn portion that is provided to at least one end of the coil spring, and that is covered by a coating configured of a viscoelastic material, the coating having a thickness of between 0.5 mm and 10 mm;
   the coil spring being interposed between the vehicle body and the axle without arranging a spring seat formed of rubber between the vehicle body and the end turn portion.

8. A suspension for a vehicle having a vehicle body and an axle, the suspension comprising:
   a coil spring interposed between the vehicle body and the axle,
   wherein:
   an end turn portion on at least one end of the coil spring is covered by a coating configured of a viscoelastic material, the coating having a thickness of between 0.5 mm and 10 mm; and
   the vehicle body includes a spring seat formed of metal, and in an assembled state, the end turn portion is in direct contact with the spring seat.

* * * * *